United States Patent
Lee et al.

(10) Patent No.: US 9,325,369 B2
(45) Date of Patent: Apr. 26, 2016

(54) METHODS AND DEVICES FOR MITIGATING INTERFERENCE WITH FHSS SIGNALS

(71) Applicant: Binatone Electronics International Ltd, Hong Kong (HK)

(72) Inventors: Heung Sang Lee, Hong Kong (HK); Hung Pong Chow, Hong Kong (HK); Wai Kuen Tin, Hong Kong (HK)

(73) Assignee: BINATONE ELECTRONICS INTERNATIONAL LTD, Hong Kong (HK)

( * ) Notice: Subject to any disclaimer, the term of this patent is extended or adjusted under 35 U.S.C. 154(b) by 0 days.

(21) Appl. No.: 14/137,009

(22) Filed: Dec. 20, 2013

(65) Prior Publication Data

US 2015/0063425 A1    Mar. 5, 2015

(30) Foreign Application Priority Data

Sep. 4, 2013  (GB) .................................. 1315696.3
Nov. 13, 2013 (GB) .................................. 1320073.8

(51) Int. Cl.
H04B 1/00      (2006.01)
H04B 1/715     (2011.01)

(52) U.S. Cl.
CPC ....................................... *H04B 1/715* (2013.01)

(58) Field of Classification Search
CPC ...... H04B 1/713; H04B 1/7156; H04B 1/715; H04B 2001/7154; H04B 1/7143
USPC ................ 375/130–139, 219–228, 239, 256, 375/259–352
See application file for complete search history.

(56) References Cited

U.S. PATENT DOCUMENTS

| 2002/0187799 | A1  | 12/2002 | Haartsen |
| 2002/0191678 | A1  | 12/2002 | Batra et al. |
| 2004/0137849 | A1  | 7/2004  | Kloper et al. |
| 2004/0204031 | A1* | 10/2004 | Kardach et al. ............ 455/552.1 |
| 2006/0088018 | A1* | 4/2006  | Black et al. ................... 370/338 |
| 2008/0150730 | A1  | 6/2008  | Hsu |
| 2010/0029204 | A1  | 2/2010  | Gao et al. |

(Continued)

FOREIGN PATENT DOCUMENTS

| CN | 201417496 Y | 3/2010 |
| CN | 102855733 A | 1/2013 |
| CN | 202995961 U | 6/2013 |

(Continued)

OTHER PUBLICATIONS

Patents Act 1977: Search Report under Section 17 for GB 1320073.8, GB Intellectual Property Office, Apr. 3, 2014, pp. 1-3, United Kingdom.

(Continued)

*Primary Examiner* — James M Perez
(74) *Attorney, Agent, or Firm* — Lowe Graham Jones PLLC

(57) ABSTRACT

Methods and devices for mitigating interference with a signal of a frequency hopping spread spectrum system are disclosed. A second signal is detected, and a property of the second signal is determined. At least one of a set of designated frequency channels used by the frequency hopping spread spectrum system is determined as having a property most similar to that of the second signal. The usage, by the frequency hopping spread spectrum system, of the at least one most similar designated frequency channel is then modified, for communication of data.

18 Claims, 8 Drawing Sheets

(56) References Cited

U.S. PATENT DOCUMENTS

2012/0207032 A1* 8/2012 Chen .................. H04L 1/24
370/252
2013/0107029 A1 5/2013 Knasel et al.

FOREIGN PATENT DOCUMENTS

| GB | 2 306 275 A | 4/1997 |
| GB | 2 380 791 A | 4/2003 |
| GB | 2487816 A | 8/2012 |
| JP | 2012231309 A | 11/2012 |
| WO | 2007118180 A2 | 10/2007 |
| WO | 2011096957 A1 | 8/2011 |
| WO | 2013039653 A2 | 3/2013 |

OTHER PUBLICATIONS

Charles Hodgdon, "Adaptive Frequency Hopping for Reduced Interference between Bluetooth and Wireless LAN", www.design-reuse.com, May 2003, pp. 1-5, Ericsson Technology Licensing, Lund, Sweden.

Stackoverflow question, "iPhone programmatically use wifi and Bluetooth at the same time?", Apr. 10, 2013.

Motorola et al., "User's Guide MBP33 Baby Monitor," User's Guide, pp. 1-28, Copyright 2011 Motorola Mobility, Inc.

Patents Act 1977: Search Report under Section 17(5) for GB 1315696.3, GB Intellectual Property Office, Nov. 29, 2013, pp. 1-4, United Kingdom.

* cited by examiner

METHODS AND DEVICES FOR MITIGATING INTERFERENCE WITH FHSS SIGNALS

CROSS-REFERENCE TO RELATED APPLICATIONS

This application claims benefit of the following patent applications which are hereby incorporated in their entirety by reference: GB 1315696.3 filed Sep. 4, 2013 and GB 1320073.8 filed Nov. 13, 2013.

FIELD OF THE INVENTION

This invention is directed to methods and devices for mitigation, avoidance or prevention of interference with frequency hopping spread spectrum (FHSS) signals and other radio signals, such as direct sequence spread spectrum (DSSS) or Wi-Fi signals.

BACKGROUND TO THE INVENTION

Radio frequency transmissions take many forms, and some are particularly useful in wireless networks. In spread spectrum transmissions a signal is spread over a wider band than the original bandwidth (usually narrow band) of the signal. One example of a spread spectrum transmission method is the frequency hopping spread spectrum (FHSS) method in which a narrow band signal to be transmitted is combined with a carrier which makes a sequence of pseudo-random changes or "hops" in frequency. The sequence is known to the transmitter and receiver, so the original signal can be retrieved at the receiver. Another example is the direct sequence spread spectrum (DSSS) method in which an original (narrow band) signal is multiplied by a pseudo-random "noise" sequence signal. Again, the sequence is known to transmitter and receiver.

Problems may arise when these types of transmission are attempted in close proximity, as interference can occur. Interference is particularly likely to occur if both transmissions are using the 2.4 GHz band, which may be desirable for many applications. One previously considered scheme for reducing interference is for the system using FHSS to rule out the use of any frequencies or channels coinciding with or near the frequencies or channels of the system using DSSS so that none of the hops will be to a channel or frequency overlapping or nearby one in use. However, this previous scheme is typically used only in low power FHSS systems (at, for example, 0 dbi—zero antenna gain in decibels-isotropic) where the FHSS signal is unlikely to affect the DSSS signal and cannot be used for high power signals. In addition, the original signal to be transmitted by these FHSS systems is usually very narrow band, as the bit rate is low (for example, only around 1 Mb required). Higher bit rates cannot be accommodated. Some previous FHSS systems require the suppression of the DSSS signal when the FHSS system is activated, for example where the signals are generated by the same apparatus. These previous schemes require that large parts of the bandwidth for FHSS are not used, as whole channels or frequency ranges near those of the DSSS signal are ignored.

STATEMENT OF THE INVENTION

In general terms, embodiments of the invention may provide a method for mitigating interference with a signal of a frequency hopping spread spectrum system, comprising: detecting a second signal, determining a property of the second signal; determining at least one of a set of designated frequency channels used by said frequency hopping spread spectrum system as having a property most similar to said property of said second signal; and modifying usage, by said frequency hopping spread spectrum system, of said at least one most similar designated frequency channel, to communicate data.

This method allows actions to mitigate, avoid or prevent interference between the FHSS signal and another signal, without having to stop using certain channels for FHSS hopping.

The detection of the second signal may be by scanning, for example using a scanner, such as a wireless scanner searching for local access points. The second signal may be a DSSS signal, such as one employed in a wireless network. Either or both signal(s) may be radio frequency signals.

The property of the second signal may be a frequency characteristic. For example, the characteristic may be the centre frequency, the modulation type, or the channel width of the second signal (or any combination of these).

The determination of the designated frequency channel having a property most similar to that of the second signal may be by comparing a frequency of the designated channel with a frequency of the second signal (for example, a centre frequency). The determination may find the designated channel having the frequency most similar to that of the second signal, for example the closest in the spectrum.

The step of modifying usage of the most similar designated frequency channel may comprise using said most similar designated frequency channel for a reduced bandwidth for the data.

Modifying usage may comprise processing the data to reduce a data bandwidth for communication via said most similar designated frequency channel. Modifying usage may comprise reducing a bandwidth of said most similar designated frequency channel. The reduced bandwidth may be less than 4.5 Mb and, for example, between 250 Kb and 1 Mb.

The method may further comprise reducing a usage of said most similar designated frequency channel in the frequency hopping spread spectrum system. This may be by reducing simply the amount of time the designated channel is used for, or the frequency (number of times in the overall cycle) the designated channel is used. For example, a duty cycle of the designated channel in the frequency hopping may be reduced.

The method may further comprise: detecting a change in the property of the second signal; re-determining the at least one of the set of designated frequency channels having a property most similar to the property of the second signal; and modifying usage, by the frequency hopping spread spectrum system, of the re-determined most similar designated frequency channel.

The method may further comprise, on detecting the second signal, determining frequencies for each of the set of designated frequency channels used by the frequency hopping spread spectrum system according to the type of the second signal.

Embodiments of the invention may provide a device for mitigating interference with a signal of a frequency hopping spread spectrum system, said device comprising:
a module configured to generate a frequency hopping spread spectrum signal to communicate data; and
a scanner configured to detect a second signal; and a processor configured to: determine a property of said second signal; and determine at least one of a set of designated frequency channels used by said frequency hopping spread spectrum module as having a property most similar to that of said second signal, wherein the module is configured to modify usage of said at least one most similar designated frequency channel, to communicate data.

The device may further comprise a module configured to generate a further signal, additional to the frequency hopping spread spectrum signal, for communication with a device generating said second signal.

Embodiments of the invention may provide a monitoring apparatus comprising:
at least one image capturing module; and
a dual mode radio communications device comprising a:
  a first module configured to generate a first signal to communicate data derived from said at least one image capturing module;
  a second module configured to generate a second signal;
  a scanner configured to detect said second signal; and
  a processor configured to:
  determine a property of the second signal; and
  determine at least one of a set of designated frequency channels used by the first module as having a property most similar to that of the second signal,
wherein said first signal is generated using a frequency hopping spread spectrum format, said second signal is generated using a different signal format to said first signal and said first module is configured to modify usage of the at least one most similar designated frequency channel to communicate said data.

The above-described features and embodiments may be combined to provide further features and embodiments of the invention.

BRIEF DESCRIPTION OF THE DRAWINGS

The invention will now be described by way of example only with reference to the accompanying drawings, in which.

DETAILED DESCRIPTION

The methods and devices described allow modification of the use of the designated channels in a frequency hopping spread spectrum system (FHSS) in response to a detected signal or available network, to alleviate interference problems with other signals. This may allow the FHSS signal to run as efficiently as possible and/or the use of higher band and higher power signals for the FHSS than are possible under previous FHSS schemes, for example up to 20 dbi and up to 4 Mb. The methods and devices described may also allow two transmission schemes to work in close proximity, without one suppressing the other, so that an FHSS module and another module, for example a DSSS module, can be housed in a dual mode radio communications device, the other module communicating with the source of a second signal, for example a wireless access point or router.

Figure 1:
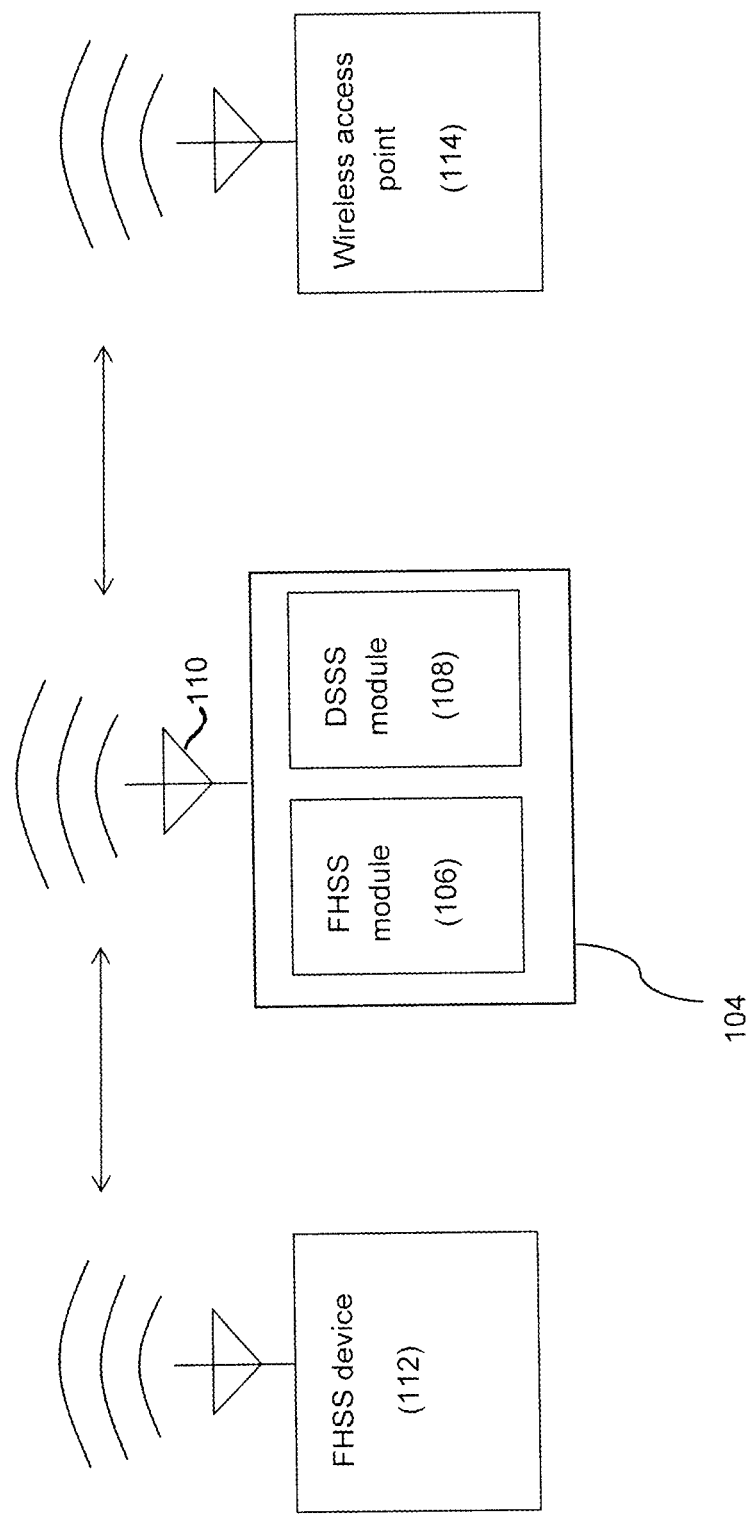
FIG. 1 is a schematic diagram illustrating a dual mode radio communications device.

FIG. 1 illustrates a dual mode radio communications device 104. The dual mode radio communications device 104 comprises an FHSS module 106 and a DSSS module 108. The FHSS module 106 is configured to generate, transmit and receive FHSS signals and the DSSS module 108 is configured to generate, transmit and receive DSSS signals. The dual mode radio communications device 104 has an antenna 110 (or one for each type of module) which allows communication wirelessly with other devices. A first such device is an FHSS enabled device 112, for example one similar to a Bluetooth™ device, but for higher powered signals and higher bit rates. A second such device is a wireless access point 114, for example using the DSSS scheme. The dual mode radio communications device 104 may, for example, access a wireless internet connection through the wireless access point 114.

An example of operation of a dual mode radio communications device such as the dual mode radio communications device 104 to mitigate interference with signals using the frequency hopping spread spectrum system will now be described with reference to FIG. 2. At 202 a signal potentially competing with an FHSS signal is detected. In the illustrated example the potentially competing signal is a DSSS signal, but it could be any type of radio signal that might compete for bandwidth or frequencies with the FHSS signal, such as other types of wireless protocol. The signal may be found by scanning to find any access points in the local area. Scanning may be implemented using a wireless scanner. In alternative examples, the scanning may find an ad hoc network device.

At 204 a determination is made as to whether the DSSS channel interferes with any of the FHSS designated channels, i.e. those frequencies that the pseudo-random scheme for hopping has chosen. The interference may simply be due to the DSSS channel and one or more of the FHSS channels overlapping. For example, if the Wi-Fi channel is 1 at 2.412 GHz, modulation is 802.11b, 20 MHz bandwidth, any FHSS channels between around 2.409 GHz and 2.415 GHz will likely be affected, and others nearby.

Determination of the interference may find the centre frequency, the modulation type or the channel width of the second signal (the DSSS channel), or any combination of them. A similarity measured between the two may be a simple difference calculation with one or a combination of these features of the competing channel. There may be more than one potentially competing signal in the area. Therefore detection 202 and determination 204 may be repeated for these other signals. For example, there may be an access point that the user is trying to access with a dual mode radio communications device using this method and other wireless network points the user is unaware of, that may nevertheless cause interference. In addition, for wider DSSS bands (22 MHz, 40 MHz) the system may need to alter more channels.

If at 204 it is determined that there is no interference, at 206 communications can continue with no modification of the FHSS channels. However, where interference, similarity, overlap or the like is detected, at 208 one or more of the closest (or all of the) FHSS channels that may be interfering is modified. This can be done in various ways, and these can be used in combination.

One option at 210 is to reduce the usage for that/those channel(s). For example, the amount of time the designated channel is used for, or the frequency (number of times in the overall cycle) the designated channel is used may be reduced. One method is to reduce the duty cycle of the designated channel in the frequency hopping scheme. This means that the interfering FHSS channel is used less, and can be reduced to the point that any noise induced is insufficient to disrupt the overall signal which the FHSS system is attempting to communicate.

Another option at 212 is to modify usage of the closest FHSS channel(s) for reduced bandwidth. This can be done in a number of ways. In one implementation, the system can be set so that these channels are only used when the system is transmitting a low bandwidth signal, such as audio only. At other times, the channels may be avoided altogether.

In more complex implementations, the bandwidth of either the channel in conflict, or of the data using it may be reduced. In the former case, if the bandwidth of the channel is reduced, there is likely to be less interference with any close channels in the competing other (DSSS) signal. The bandwidth may be narrow band, or very narrow band, although the latter may only be usable for audio data. This may be done by a number of methods and previously considered schemes, for example by re-arranging the data for transmission so that low bandwidth portions of the data can be passed using a narrow band channel (i.e. the now narrowed closest FHSS channel), or to pass less of the data over that channel in the frequency hopping scheme, so that a narrow band can be used.

In one example, the narrow band used is 250 Kb to 1 Mb (i.e. 0.125 MHz to 500 MHz, similar to Bluetooth™ FHSS) which may have less interference with Wi-Fi. The narrow band usage should be under 4.5 Mb (FCC allows at least 15 non-overlapping channels, so the maximum bandwidth is preferably not higher than 4.5 Mb)

In general, narrow band and very narrow band usage are as follows:
Narrow Band: 2M RF (40 Non-Overlapping Channels)
Very Narrow Band: 1M RF (80 Non-Overlapping Channels)

As an example, if the channel used by the Wi-Fi is channel one (e.g. 2.412 GHz), the closest clean channels for FHSS may be 2.4095 GHz and 2.4145 GHz). Modifying these two channels to narrow band or reducing usage of these two channels (or both) will help mitigate interference between the Wi-Fi and the FHSS.

Figure 2:
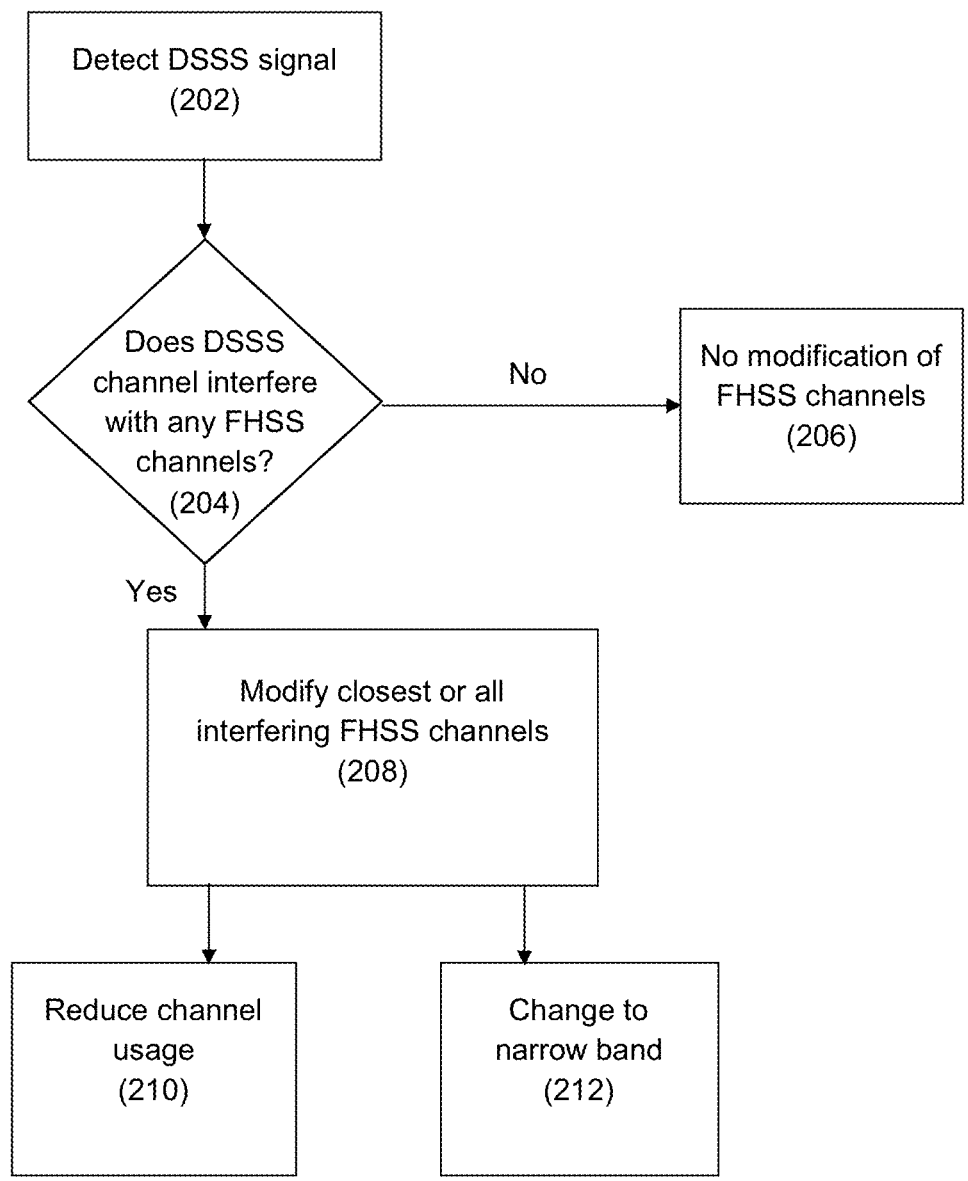
FIG. 2 is a flow chart illustrating examples of methodology for mitigating signal interference in a dual mode radio communications device such as the dual mode radio communications device shown in FIG. 1.

In addition, the processes illustrated by FIG. 2 can be repeated at any time, for example to keep updated, or if it is detected that the second signal (for example. the DSSS signal) has changed to a different type, or to use different channels. The new channels are detected, and new determinations are made as to the closest FHSS channels, and how to modify them.

In one example, the FHSS system is primed only to use designated channels which are usually free from interference, such as those which typically are not used or fall between common DSSS implementations. For instance, the frequency between a common first and second channel Wi-Fi implementation is (2.412 GHz+2.417 GHz)/2=2.4145 GHz (channel 5 in the example below).

For example, the FHSS system may use the following designated frequencies (with, for example, 500 KHz tolerance):

| Channel | Frequency |
| --- | --- |
| 1 | 2402 MHz, |
| 2 | 2404 MHz |
| 3 | 2406 MHz, |
| 4 | 2409.5 MHz |
| 5 | 2414.5 MHz |
| 6 | 2419.5 MHz |

-continued

| Channel | Frequency |
| --- | --- |
| 7 | 2424.5 MHz |
| 8 | 2429.5 MHz |
| 9 | 2434.5 MHz |
| 10 | 2439.5 MHz |
| 11 | 2444.5 MHz |
| 12 | 2449.5 MHz |
| 13 | 2454.5 MHz |
| 14 | 2459.5 MHz |
| 15 | 2464.5 MHz |
| 16 | 2469.5 MHz |
| 17 | 2472 MHz |
| 18 | 2474 MHz |
| 19 | 2476 MHz |
| 20 | 2478 MHz |

Using these channels in any case, before consideration of any interfering external signal, will usually reduce interference on all wireless access points, whether focussed or not. The methods of the invention will therefore build on this initial interference mitigation effort.

Specific examples of implementations are:
Case 1: 802.11b (20 MHz Bandwidth)
WiFi channel is 1, Modulation is 802.11b
1. Channel 4,5—Reduce Channel Scanning Duty
2. Channel 4,5—Change to Very Narrow Band
Case 2: 802.11gn (22 MHz Bandwidth)
WiFi channel is 3, Modulation is 802.11g, Bandwidth is 22 MHz
1. Channel 5,6,7,8 is Reduced Channel Scanning Duty
2. Channel 5,6,7,8 is Changed to Very Narrow Band
Case 3: 802.11n (40 MHz Bandwidth)
WiFi channel is 3, Modulation is 802.11n, Bandwidth is 40 MHz
1. Channel 4,5,6,7,8 is Reduced Channel Scanning Duty
2. Channel 4,6,8 is changed to very narrow Band
In this example (case 3) the bandwidth is 40 MHz (not 22 MHz), so the channel spacing must be wider, hence only channels 4,6,8 are used.

Figure 3:
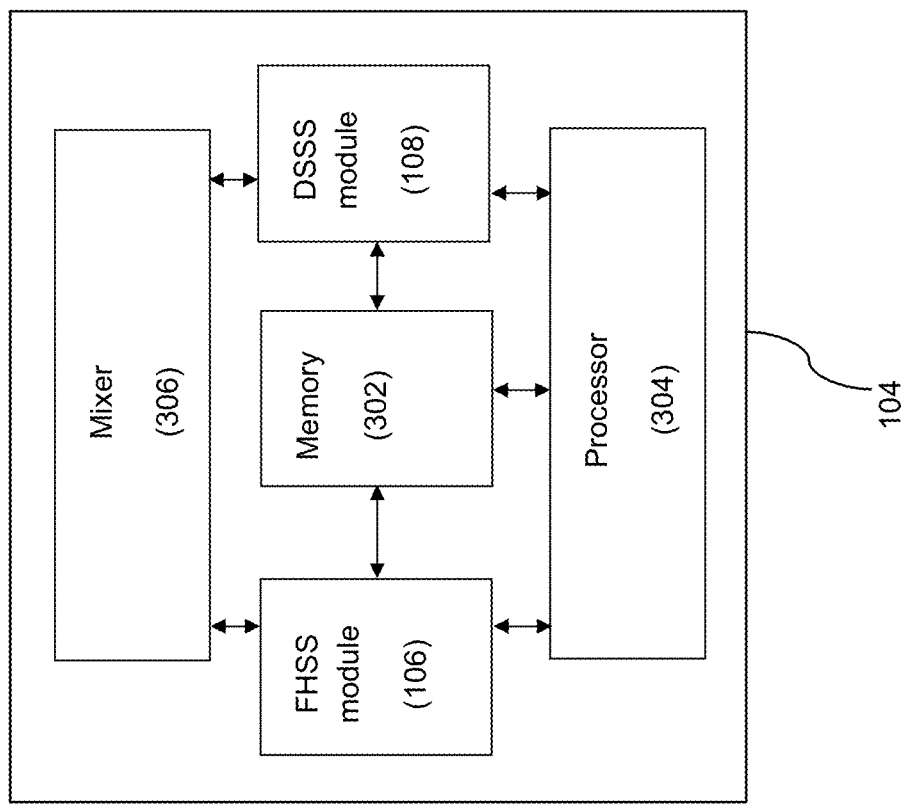
FIG. 3 is a schematic diagram showing the dual mode radio communications device of FIG. 1 in greater detail.

Referring to FIG. 3 the dual mode radio communications device 104 comprises the FHSS and DSSS modules 106, 108. As such, the dual mode radio communications device 104 is capable of communicating via either or both network type. The dual mode radio communications device 104 may further comprise a memory 302 and a processor 304. The processor 304 may, for example, provide processing capability to scan the signals available to the DSSS module for detecting potential interference and where there is potential interference determine the at least one of the set of designated frequency channels used by the frequency hopping spread spectrum system as having a property most similar to that of the second signal, and (or at least aiding) the FHSS module 106 with modifying usage, by the frequency hopping spread spectrum system, of the at least one most similar designated frequency channel, for the communication of data. The dual mode radio communications device 104 may also comprise a RF mixer 306. Here it is shown as being external to the FHSS and DSSS modules 106 and 108. The RF mixer 306 is connected to the antenna 110 to allow communication of the signals to and from the dual mode radio communications device 104.

An example of an apparatus that may incorporate a dual mode radio communications device such as the dual mode radio communications device 104 is a monitoring apparatus comprising an image capturing device, such as a video camera. The monitoring apparatus may have both RF modules working in the 2.4 GHz band, one complying with the Wi-Fi standard and the other using FHSS. Normally housing both RF modules together would mean they would "compete". However the above-described systems and methodology can be used to mitigate or remove such problems. The monitoring apparatus may be used, for example, for home applications, such as baby, pet or security monitoring. Via the FHSS radio, image data captured by the image capturing device can be viewed on a special monitoring device within the home or via the Wi-Fi connection on any connected device, such as a smart phone, or tablet, anywhere outside the home. Alternative apparatus, such as mobile security or communication units, could use the same principle, and communicate audio and/or video over either or both radio schemes.

Figure 4:
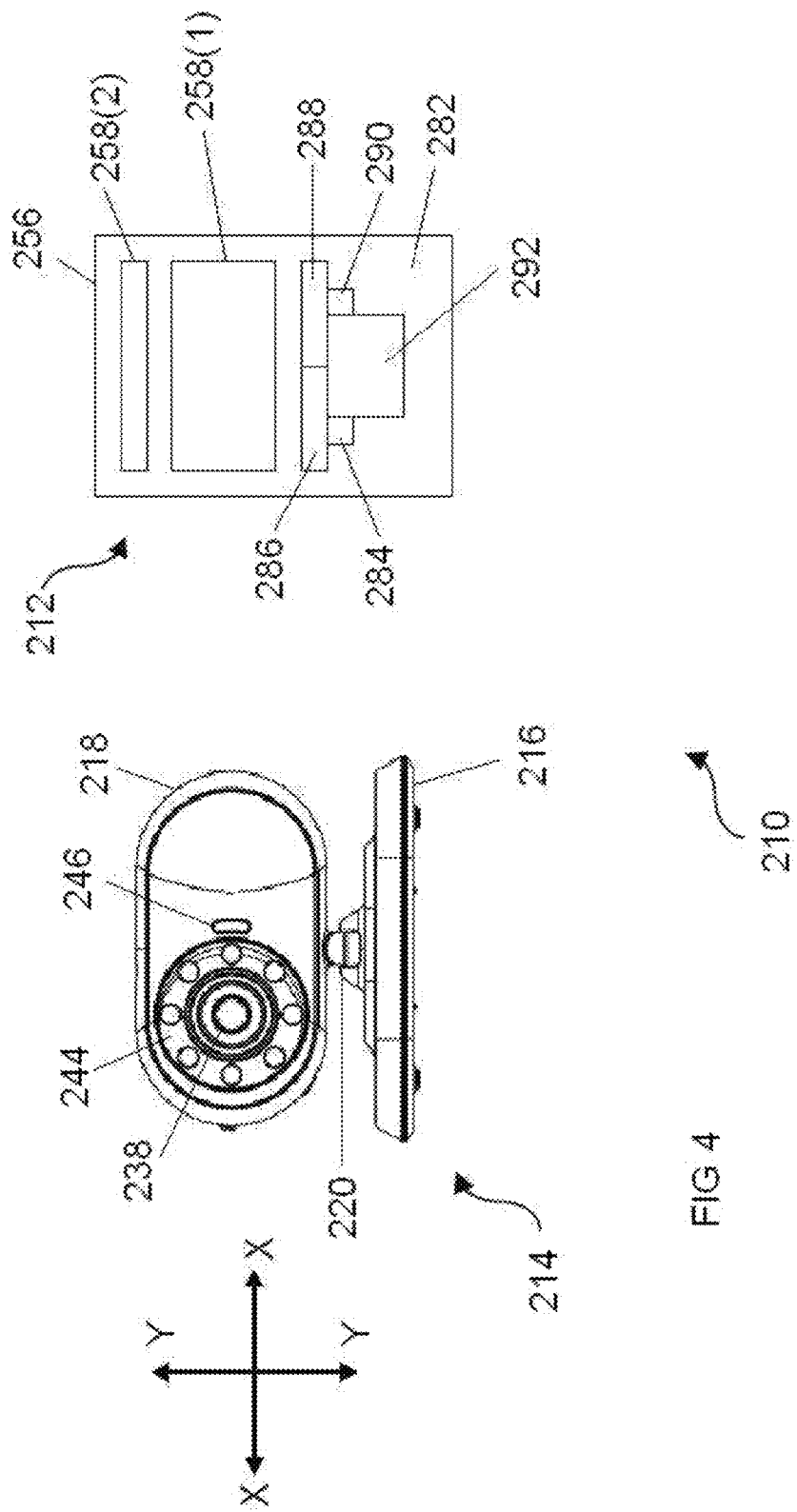
FIG. 4 shows at monitoring apparatus comprising a portable receiver and a monitoring device comprising a dual mode radio communications device.

FIG. 4 shows monitoring apparatus in the form of an infant monitoring apparatus 210 comprising a portable receiver 212 and an infant monitoring device 214. The infant monitoring device 214 is to be located at a first location, such as a bedroom, at which a infant has been placed, typically to sleep. The infant monitoring device 214 is configured to transmit infant monitoring data to the portable receiver 212. The portable receiver 212 may be held by a user, such as a parent or other carer, at a second location remote from the first location. The first and second locations may be on different floors of a building, or the first may be within a building while the second is without.

Figure 5:
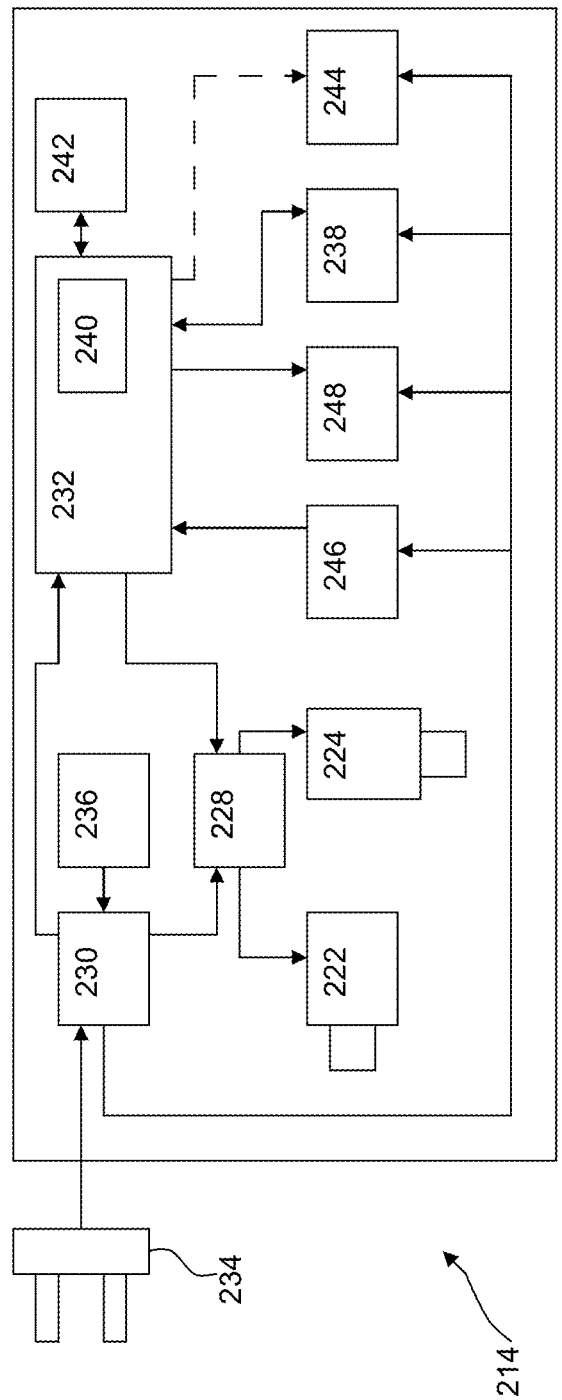
FIG. 5 is a schematic illustration of the infant monitoring device.

Referring to FIGS. 4 and 5, the infant monitoring device 214 comprises a base 216 and a housing 218 mounted on the base. The connection 220 between the housing 218 and the base 216 comprises an articulation so that the housing can be moved relative to the base by a drive unit mounted in the housing. The drive unit comprises two motors 222, 224 that can be powered to cause the housing to pivot about the X and Y axes. The motors 222, 224 may be stepper motors. The drive unit further comprises a motor controller 228 to control actuation of the motors 222, 224. The motor controller 228 may receive electric power from a power supply unit 230 and actuate the motors 222, 224 in response to command signals issued by a device controller 232 in response to command signals received from the portable receiver 212. The power supply unit 230 may distribute electric power received from a mains supply via an ac/dc adapter provided in a plug 234 by which the infant monitoring device 214 can be connected to a mains electric supply. In other examples, the ad/dc adapter may be a part of the power supply unit 230. In some examples, the power supply unit 230 may also distribute electrical power received from a battery supply 236 housed in a compartment provided in the infant monitoring device 214.

The infant monitoring device 214 comprises an image capturing device 238. The image capturing device 238 comprises a video camera having one or more lenses and a semi-conductor device that receives light via the lens(es) and records the received light electronically. The semi-conductor device may be a 1/6.5" VGA CMOS image sensor. The image capturing device 238 is connected with the device controller 232. The device controller 232 comprises a processor 240 that is operable to process digital video data output by the image capturing device 238 into digital video frame data for transmission to the portable receiver 212. The processor 240 may be provided with an integral buffer memory to buffer the digital video frame data. Alternatively, a separate buffer memory may be provided. The buffer memory may comprise volatile RAM provided by an SRAM or DRAM module. The device controller 232 is connected with a dual mode radio communications device 242 that is operable to convert the digital video frame data into a format suitable for wireless transmission to the portable receiver 212. The dual mode radio communications device 242 is configured to generate and transmit using a FHSS format and another wireless format that is not the FHSS format and employs interference mitigation as previously described to permit side by side transmission using the two formats. In some examples the dual mode radio communications device 242 may be a dual mode radio communications device as illustrated by FIG. 3 and the transmissions may be in the 2.4 GHz waveband. In the example illustrated by FIGS. 4 to 8, the dual mode radio communications device 242 may be configured to transmit to the portable receiver 212 using the FHSS module and the portable receiver 212 is configured to receive signals generated using the FHSS format The infant monitoring device 214 may further comprise a night vision unit 244. The night vision unit 244 may comprise a plurality of LEDs activated automatically by a light sensor. In some examples, the night vision unit 244 may be actuated by a clock signal from the device controller 232 or a signal issued by the device controller in response to a command signal issued by a user using a suitably equipped portable receiver 212 (these optional or alternative modes are indicated in FIG. 5 by a dashed line connection between the device controller 232 and night vision unit 244). In the illustrated example, the night vision unit 244 comprises an array of eight LEDs disposed at equi-spaced intervals on a pitch circle diameter so as to surround the image capturing device 238.

The infant monitoring device 214 may further comprise an audio capturing device, such as a microphone 246. The microphone 246 may be incorporated in the image capturing device 238. In examples in which a microphone is included in the image capturing device 238, the image capturing device may be provided with an audio codec to encode analogue audio data as digital data for transmission to the portable receiver 212 with the digital video data.

The digital video frame data and, where obtained, digital audio data transmitted by the infant monitoring unit 214 comprises infant monitoring data that is received by the portable receiver 212 and output by the portable receiver 212 in a form a user can access so as to be able to monitor an infant's condition.

The infant monitoring device 214 may further comprise an audio output device 248 (FIG. 5), such as a loudspeaker housed by the housing 218. In examples provided with an audio output device 248, the device controller 232 may be provided with an audio codec and output interface so as to be able to output an analogue signal to the audio output device. The audio output device 248, when provided, can be used to output audio received from portable receivers 212 configured to transmit audio that is input contemporaneously by a user, or output soothing messages or other sounds stored in non-volatile memory accessible by the device controller 232.

Figure 6:
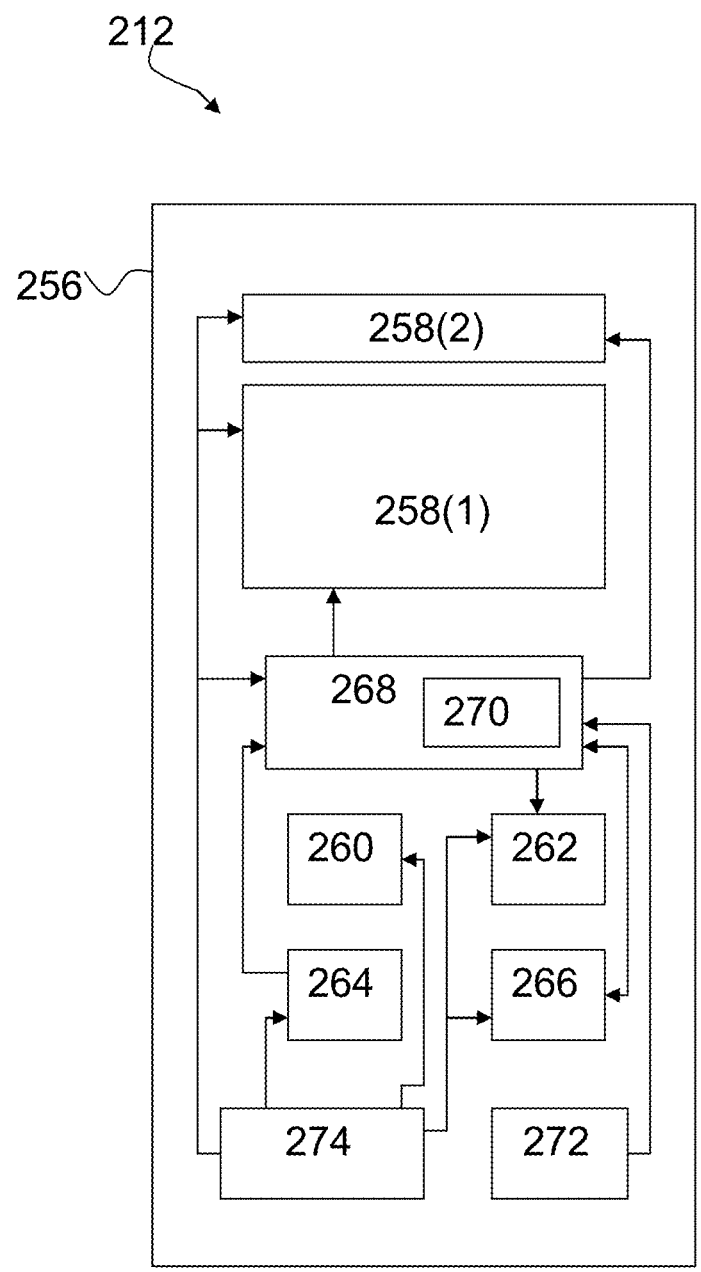
FIG. 6 is a schematic illustration of the portable receiver.
Figure 8:
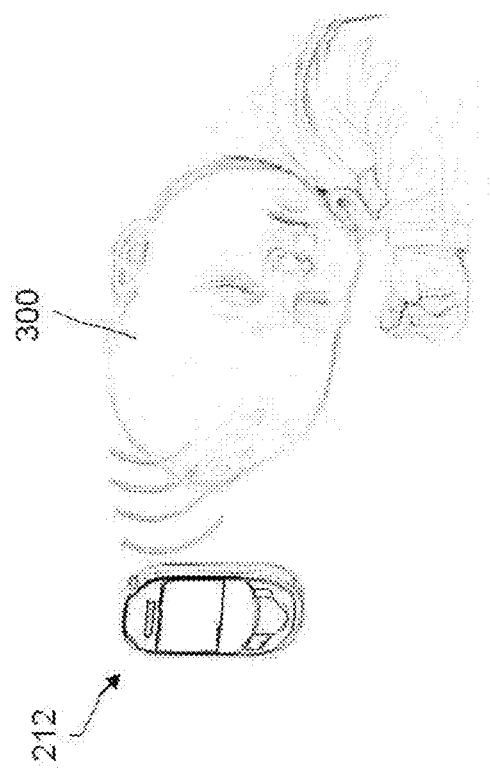
FIG. 8 shows the portable receiver in use.

Referring to FIGS. 4 and 6, the portable receiver 212 comprises a handheld housing 256, a display 258(1), 258(2) and a non-contact temperature sensing device 260 housed by the housing. The portable receiver 212 may further comprise an audio output device 262, an audio capturing device 264, a transceiver 266, a device controller 268 that includes a processor 270, an input interface 272 and a power supply 274.

The display may comprise a TFT LCD screen 258(1) to display video images derived from infant monitoring data received from the infant monitoring unit 214. The display may additionally comprise an audio level indicator 258(2). The audio level indicator 258(2) may comprise an array of LEDs to provide a visual sound level indication for the audio output by the audio output device 262 or the audio signal captured by the audio capturing device 264. The array of LEDs may comprise a series of LEDs arranged in line.

The transceiver 266 is configured to receive infant monitoring data transmitted by the infant monitoring device 214 and communicate it to the device controller 268 in a form the processor 270 can process for display via the screen 258(1). In examples in which the infant monitoring device 214 is configured to transmit digital audio data to the portable receiver 212, the device controller 268 is provided with an audio codec and output interface for outputting an analogue signal to the audio output device 262. The audio output device 262 may be a loudspeaker housed by the housing 256. Additionally, or alternatively, the audio output device 262 may be an output jack that allows the portable receiver 212 to be connected to an earphone or external speaker.

The audio capturing device 264 may comprise a microphone housed by the housing 256.

The audio capturing unit 264 may be connected with the device controller 268 to enable analogue audio data received from the microphone to be encoded as digital data for transmission by the transceiver 266 to the infant monitoring device 214. Providing the portable receiver 212 with this facility allows a user, to send soothing messages to the infant via an audio output device of the infant monitoring device 214.

Figure 7:
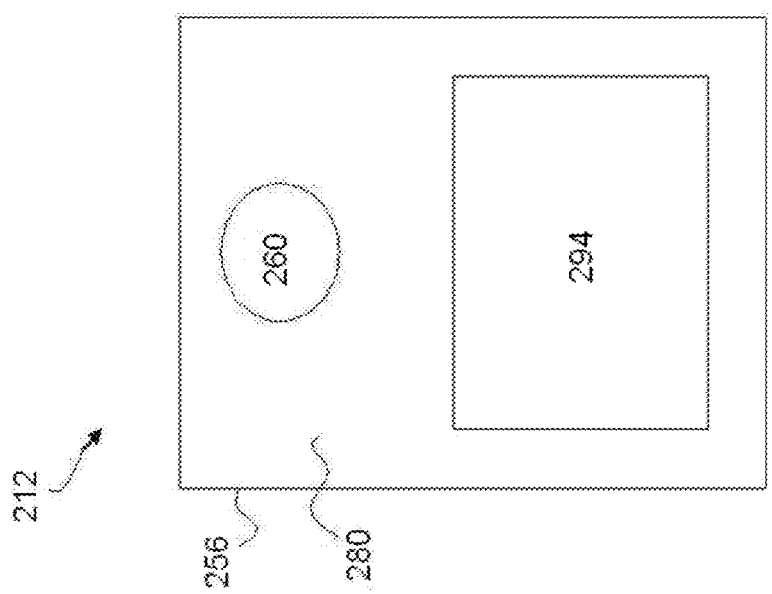
FIG. 7 is a rear elevation of the portable receiver.

Referring to FIG. 7, the non-contact temperature sensing device 260 may be housed by the housing 256 so as to point from a major face 280 of the housing disposed opposite the major face 282 (FIG. 4) at which the display 258 is visible. The temperature sensing device 260 may be an infra red thermometer configured to output a digital signal indicative of a sensed temperature. The digital signals output the by the temperature sensing device 260 are communicated to the processor 270, which is configured to process signals from the temperature sensing device 260 and output a signal to the display that causes a temperature reading to be displayed on the screen 258(1). In other examples, the portable receiver 212 may be provided with a further display device to display the temperature reading. However, it is convenient and economic to display the temperature reading using the screen 258(1).

Referring to FIG. 1, the interface unit 272 of the portable receiver 212 may comprise a plurality of buttons to allow a user, to input commands to the portable receiver. In the illustrated example, the interface unit 272 comprises:
a power on/off button 284;
a video on/off button 286;
a temperature sensor on/off button 288;
an audio input device on/off and recording level adjustment button 290; and
a multi-function pad 292 operable to provide volume +/− and pan/tilt and zoom control inputs for the image capturing device 238.

The power supply 274 distributes electrical power received from a battery supply housed in a compartment housed by the housing 256 and accessible via a cover 294 (FIG. 7) provided in the major face 280. The battery supply may be rechargeable by removal from the housing 256 and connection with a suitable battery charger. Alternatively, the portable receiver 212 may be provided with an input socket (not shown) to allow the battery supply to be connected to a charger unit that may be a part of a plug (not shown) that can be plugged into a mains electrical supply or allow the portable receiver to be plugged onto a charger cradle (not shown). In another example the battery supply may be recharged by an inductive charging system.

In use, a user can situate the infant monitoring device 214 in a room or area in which an infant is to be left, typically to sleep and go to another room or area with the portable receiver 212. The portable receiver 212 can receive infant monitoring data transmitted by the infant monitoring device 214 allowing the user to view the infant via the screen 258(1) and hear sounds via the audio output device 262. By operation of the multi-function pad 292 the user can cause command signals to be transmitted to the infant monitoring device 214 to cause the image capturing device 238 to pan (pivot about the Y-Y axis), tilt (pivot about the X-X axis) or zoom in and out. The user can operate the button 290 to activate the audio capturing device 264 and send audio messages to the infant via the audio output device 248 of the infant monitoring device. Additionally, the user can take the portable receiver 212 to the infant and operate the button 288 to activate the non-contact temperature sensing device 260 and obtain a reading of the infant's temperature, which will be displayed on the screen 258(1). This has the advantage that the temperature reading can be obtained without disturbing the infant and even in cases in which the infant is awake, avoids having to obtain the infant's cooperation in using a contact temperature sensor such as a mercury thermometer. It s to be understood that while the temperature sensing device 260 is intended primarily for obtaining an infant's temperature, it can be used to obtain non-contact temperature readings of other things.

Within a relatively short range, such as within a domestic environment, a user can monitor an infant using images or audio received by the portable receiver 212 from the infant monitoring device 214 by transmission from the FHSS module of the dual mode radio communications device 242. If the user moves out of range of the FHSS transmissions, the user may continue to monitor the infant by means of transmissions from the dual mode radio device 242 made by the other module and received by a mobile communications device, such as a smart phone or tablet. For example, the signal using the other module may be received by a wireless access point, such as a router, providing a wireless internet connection. Because the two radio transmission modules of the dual mode radio communications device 242 are able to transmit at least substantially simultaneously, a baby sitter and parent may both be able to receive transmissions from the infant monitoring device 214 allowing them to both monitor the infant. For example, a parent may leave an infant in the care of a baby sitter, who can monitor the infant using the portable receiver 212, and still be able to monitor the infant using his/her smart phone or tablet. Furthermore, because both radio transmission modules can work side by side, it is not necessary for a user to remember to switch between the two, when for example, leaving the coverage area of the FHSS module.

It is to be understood that a temperature sensing device is not an essential feature of the infant monitoring apparatus 210. Furthermore, the image capturing device may be configured to capture still images rather than video images. It is also not essential that the FHSS module transmits to a portable receiver as illustrated by FIGS. 4 and 6. In principle, the FHSS module may transmit to any suitable device equipped to receive FHSS signals. For example, the FHSS module may transmit to a digital picture frame as disclosed by the Applicant's WO2012/104618. It is also not essential that the infant monitoring device 214 has a drive unit to point the image capturing device. In other examples, the orientation of the image capturing device may be fixed. It is also to be understood that the infant monitoring apparatus 210 may be used to monitor things other than infants in domestic and non-domestic applications.

Figure 9:
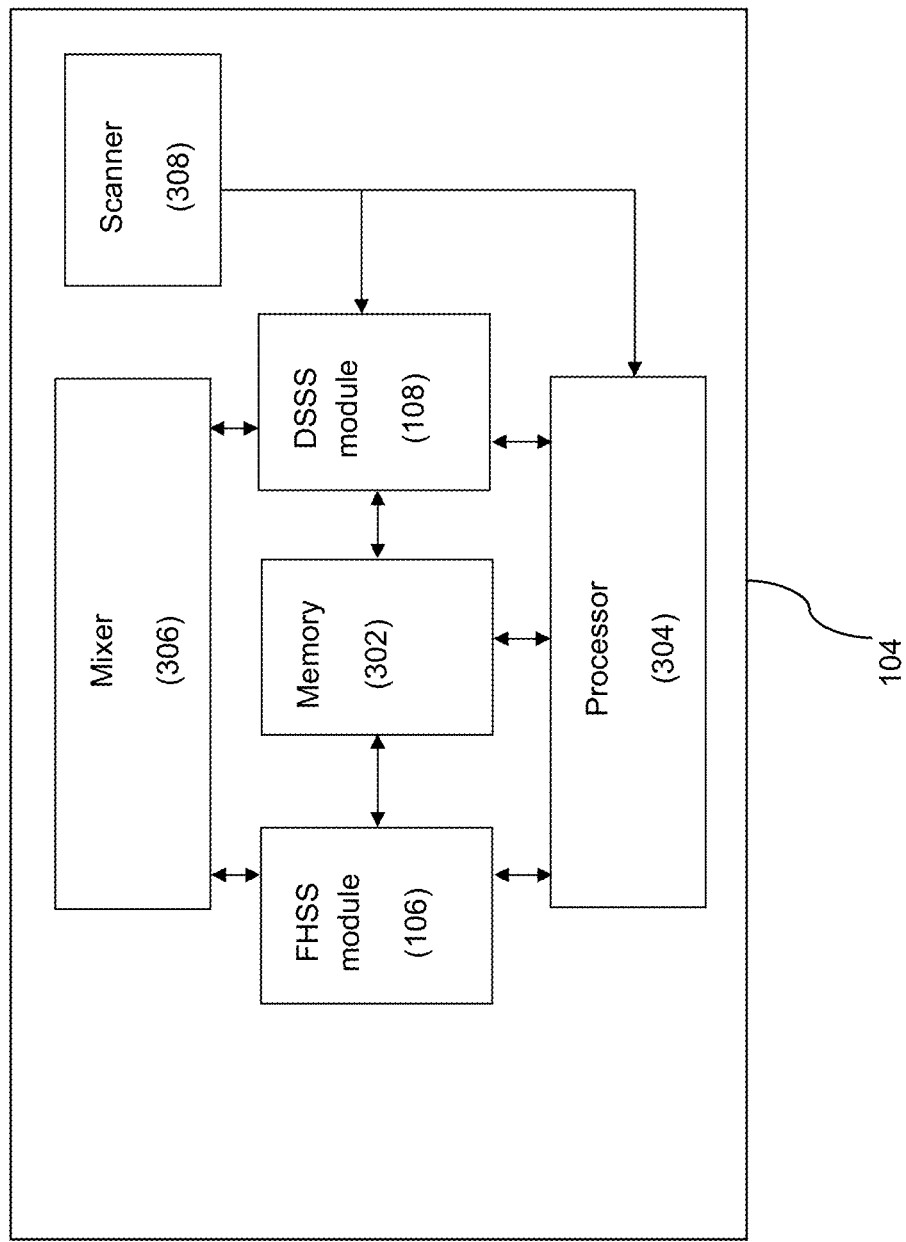
FIG. 9 shows a modification to the dual mode radio communications device illustrated by FIG. 3.

In the example illustrated by FIG. 3, the processor 304 is configured to operate as a scanner to detect signals that may compete with the FHSS module. The processor 304 may operate software or firmware configured to provide a scanner function or comprise a chip designed to incorporate the scanning function. FIG. 9 illustrates a modification of the dual mode radio communications device of FIG. 3 in which a dedicated scanner is 308 is provided.

It will be appreciated by those skilled in the art that the invention has been described by way of example only, and that a variety of alternative approaches may be adopted without departing from the scope of the invention, as defined by the appended claims.

We claim:

1. A method of mitigating interference with a first signal that is a signal of a frequency hopping spread spectrum system, comprising:
   detecting, with a radio communications device, a second signal that is not a frequency hopping spread spectrum signal;
   determining, with the radio communications device, a property of said second signal;
   determining, with the radio communications device, at least one of a set of designated frequency channels used by said frequency hopping spread spectrum system as having a property most similar to said property of said second signal; and
   modifying usage, with the radio communications device, of said at least one most similar designated frequency channel by said first signal to communicate data so as to mitigate interference between said first and second signals by reducing a frequency bandwidth for the data of the first signal when said first and second signals are concurrently communicating on the at least one similar designated frequency channel during simultaneous transmission of said first and second signals.

2. A method as claimed in claim 1, wherein said property of said second signal is a frequency characteristic.

3. A method as claimed in claim 1, wherein modifying usage of said at least one most similar designated frequency channel by said first signal further comprises processing the data to reduce a data bandwidth for communication via said at least one most similar designated frequency channel.

4. A method as claimed in claim 1, wherein said reduced bandwidth is less than 4.5 Mb.

5. A method as claimed in claim 4, wherein said reduced bandwidth is between 250 Kb and 1 Mb.

6. A method as claimed in claim 1, further comprising reducing usage of said at least one most similar designated frequency channel by said first signal by reducing usage of said at least one similar designated frequency in the frequency hopping spread spectrum system.

7. A method as claimed in claim 1, further comprising:
   detecting a change in said property of said second signal; and
   re-determining said at least one of said set of designated frequency channels having a property most similar to said property of said second signal; and
   modifying usage, by the frequency hopping spread spectrum system, of said re-determined at least one most similar designated frequency channel to communicate data so as to mitigate interference between said first and second signals during simultaneous transmission of said first and second signals.

8. A method as claimed in claim 1, further comprising, on detecting said second signal, determining frequencies for each of said set of designated frequency channels used by said frequency hopping spread spectrum system according to the type of said second signal.

9. A radio communications device, said device comprising:
   a first module configured to generate a frequency hopping spread spectrum signal to communicate data;
   a scanner configured to detect a second signal that is not a frequency hopping spread spectrum signal; and
   a processor configured to:
      determine a property of said second signal;
      determine at least one of a set of designated frequency channels used by said frequency hopping spread spectrum module as having a property most similar to said property of said second signal; and
   said first module is further configured to modify usage of said at least one most similar designated frequency channel by said frequency hopping spread spectrum signal to communicate data so as to mitigate interference between said frequency hopping spread spectrum signal and said second signal by reducing a frequency bandwidth for the data of the frequency hopping spread spectrum signal when said frequency hopping spread spectrum signal and second signal are concurrently communicating on the at least one similar designated frequency channel during simultaneous transmission of said frequency hopping spread spectrum signal and said second signal.

10. A radio communications device as claimed in claim 9, further comprising a second module configured to generate a further signal, additional to said frequency hopping spread spectrum signal, to communicate with a device generating said second signal.

11. A radio communications device as claimed in claim 10, wherein said device generating said second signal is a router configured to provide internet access.

12. A monitoring apparatus comprising at least a monitoring device, the monitoring device comprising:
   at least one image capturing device configured to capture image data; and
   a dual mode radio communications device comprising:
      a first module configured to generate a first signal using a frequency hopping spread spectrum format to communicate data derived from said image data;
      a second module configured to communicate with a device that generates a second signal that uses formats other than said frequency hopping spread spectrum format;
   a processor configured to:
      detect and determine a property of said second signal; and
      determine at least one of a set of designated frequency channels used by the first module as having a property most similar to that of said second signal; and
   said first module is further configured to modify usage of the at least one most similar designated frequency channel by said first signal to communicate said data so as to mitigate interference between said first and second signals by reducing a frequency bandwidth for the data of the first signal when said first and second signals are concurrently communicating on the at least one similar designated frequency channel during simultaneous transmission of said first and second signals.

13. A monitoring apparatus as claimed in claim 12, wherein said monitoring device generating said second signal is a router configured to provide internet access.

14. A monitoring apparatus as claimed in claim 12, further comprising a portable receiver configured to receive said first signal transmitted by said first module and having a display to display images derived from said data communicated by said first signal.

15. A monitoring apparatus as claimed in claim 14, further comprising an audio capturing device, within the monitoring device, configured to capture audio data associated with said image data, wherein said data communicated by said first signal includes data derived from said audio data and said portable receiver comprises an audio output device to output audio derived from said data communicated by said first signal.

16. A monitoring apparatus as claimed in claim 14, wherein said portable receiver further comprises an input device to receive user input commands to control said at least one image capturing device and configured to transmit command signals based on said user input commands to said at least one image capturing device using said frequency hopping spread spectrum format.

17. A monitoring apparatus as claimed in claim 14, wherein said portable receiver further comprises a non-contact temperature sensing device.

18. A monitoring apparatus as claimed in claim 12, wherein said second module is further configured to generate said second signal using a direct sequence spread spectrum format.

* * * * *